(12) United States Patent
Mirigliani et al.

(10) Patent No.: US 7,683,118 B2
(45) Date of Patent: Mar. 23, 2010

(54) PROCESS FOR PREPARING FLUOROPOLYMER DISPERSIONS

(75) Inventors: Alberto Mirigliani, Biella (IT); Evasio Deregibus, Alessandria (IT); Valeri Kapeliouchko, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 864 days.

(21) Appl. No.: 11/406,492

(22) Filed: Apr. 19, 2006

(65) Prior Publication Data

US 2006/0247366 A1     Nov. 2, 2006

(30) Foreign Application Priority Data

Apr. 20, 2005   (IT)   ............ MI2005A0705

(51) Int. Cl.
*C08L 27/12* (2006.01)

(52) U.S. Cl. ............ 524/544; 524/379; 524/423; 524/546; 523/310; 562/605

(58) Field of Classification Search .......... 524/544, 524/546, 379, 423; 523/310; 562/605
See application file for complete search history.

(56) References Cited

U.S. PATENT DOCUMENTS

| | | | |
|---|---|---|---|
| 2,559,752 A | | 7/1951 | Berry |
| 3,037,953 A | * | 6/1962 | Marks et al. ............ 524/546 |
| 3,271,341 A | | 9/1966 | Garrison, Jr. |
| 3,301,807 A | * | 1/1967 | Hoashi .............. 524/376 |
| 3,536,643 A | | 10/1970 | Stryker et al. |
| 3,704,272 A | * | 11/1972 | Holmes ............. 524/376 |
| 4,369,266 A | | 1/1983 | Kuhls et al. |
| 4,380,618 A | | 4/1983 | Khan et al. |
| 4,864,006 A | | 9/1989 | Giannetti et al. |
| 4,990,283 A | | 2/1991 | Visca et al. |
| 5,789,508 A | | 8/1998 | Baker et al. |
| 5,858,467 A | | 1/1999 | Lenti et al. |

(Continued)

FOREIGN PATENT DOCUMENTS

DE        100 18 853 A1     4/2000

(Continued)

OTHER PUBLICATIONS

"Nonionic Surfactants", Ed. M.J. Schick, Marcel Dekker, 1967, pp. 76-85.

(Continued)

*Primary Examiner*—Peter D. Mulcahy
*Assistant Examiner*—Henry Hu
(74) *Attorney, Agent, or Firm*—Arent Fox LLP

(57) ABSTRACT

A process for preparing a fluoropolymer dispersion that is substantially anionic fluorinated surfactant free includes adding to a fluoropolymer dispersion a nonionic surfactant having a cloud point (CP) between 40 and 80° C. in a concentration of 1.5% to 50% by weight of the fluoropolymer, heating the dispersion up to a temperature $T_c$ in a range of CP±10°C., decanting the dispersion in a reactor at $T_c$ until obtaining a lower aqueous phase containing a concentrated fluoropolymer dispersion and an upper aqueous phase substantially not containing the fluoropolymer dispersion, washing the decanted dispersion with a solution of water and nonionic surfactant having a concentration of the nonionic surfactant of 0.5% to 50% by weight of the fluoropolymer, removing the upper aqueous phase from the upper part of the reactor, and discharge and recovery of the fluoropolymer dispersion.

21 Claims, 4 Drawing Sheets

U.S. PATENT DOCUMENTS

Figure 1:
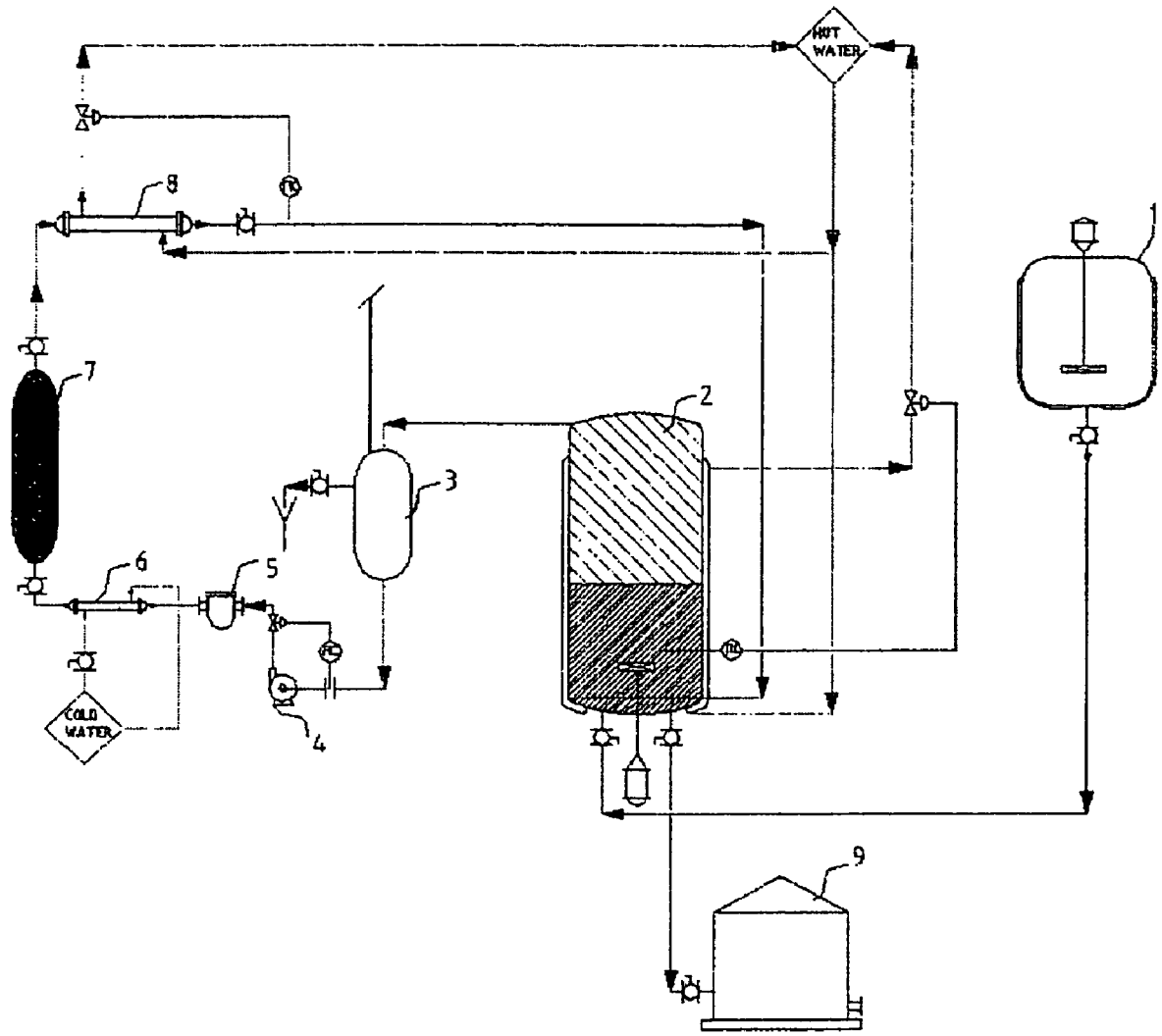

| | | | |
|---|---|---|---|
| 6,136,893 A | 10/2000 | Yamashita et al. | |
| 6,169,139 B1 * | 1/2001 | van Cleeff | 524/544 |
| 6,297,334 B1 | 10/2001 | Marchese et al. | |
| 6,479,591 B2 | 11/2002 | Kapeliouchko et al. | |
| 6,518,352 B1 | 2/2003 | Visca et al. | |
| 6,576,703 B2 | 6/2003 | Kapeliouchko et al. | |
| 6,720,437 B2 * | 4/2004 | Jones et al. | 554/191 |
| 6,956,078 B2 * | 10/2005 | Cavanaugh et al. | 524/378 |
| 7,141,620 B2 * | 11/2006 | Hoshikawa et al. | 524/378 |
| 2003/0153674 A1 | 8/2003 | Visca et al. | |

FOREIGN PATENT DOCUMENTS

| | | |
|---|---|---|
| EP | 0 194 690 A2 | 9/1986 |
| EP | 194690 A2 * | 9/1986 |
| EP | 1 155 055 B1 | 11/2001 |
| EP | 1 489 104 A1 | 12/2004 |
| EP | 1 574 527 A1 | 9/2005 |
| WO | 03/051988 A2 | 6/2003 |
| WO | WO-03/078479 A1 * | 9/2003 |

OTHER PUBLICATIONS

"Nonionic Surfactants", Ed. M.J. Schick, Marcel Dekker, 1967, pp. 103-141.

Kirk Othmer "Encyclopedia of Chemical Technology", vol. 14, pp. 737-783, J. Wiley & Sons, 1995.

* cited by examiner

PROCESS FOR PREPARING FLUOROPOLYMER DISPERSIONS

The present invention relates to a process for preparing fluoropolymer aqueous dispersions substantially fluorinated surfactant free, in particular fluorinated ionic surfactants free.

More particularly the present invention relates to a process for preparing aqueous fluoropolymer dispersions substantially free from perfluorooctanoate under the form of acid or its salts.

Aqueous dispersions of fluoropolymers substantially fluorinated surfactant free are meant dispersion wherein the content of fluorinated surfactants, referred to the fluoropolymer weight, is lower than 100 ppm, in particular lower than 50 ppm, more in particular lower than 5 ppm.

It is well known in the prior art that for the production of fluorinated polymers there are two different polymerization processes: the suspension polymerization and the emulsion polymerization.

In the suspension polymerization, polymer granules having millimetric sizes are obtained.

In emulsion polymerization a colloidal aqueous dispersion is obtained having particle diameter of the order from some nanometers, generally 10 nm, to hundreds of nanometers, from 100 nm to 400 nm. The fluoropolymer emulsion polymerization process is carried out by using a mild stirring and in the presence of surfactants not acting as chain transfer agent. All this for avoiding obtaining fluoropolymers having a low molecular weight and therefore poor mechanical properties. Said surfactants are called non telogenic surfactants, see for example U.S. Pat. No. 2,559,752. Salts of perfluoroalkanoic acid, in particular the ammonium salt and/or alkaline metal salts of the perfluorooctanoic acid, indicated hereinafter with PFOA, are industrially very often used. Other (per)fluorinated anionic surfactants are also used, see for example U.S. Pat. No. 3,271,341, U.S. Pat. No. 4,380,618, U.S. Pat. No. 4,864,006, U.S. Pat. No. 5,789,508.

The PFOA is the most industrially used surfactant in emulsion polymerization as not telogenic, thus allowing to obtain dispersions of fluorinated polymers having a high molecular weight, and allowing to obtain dispersions with high shelf life.

It is also known that in the applications of fluoropolymer dispersions as coating or in the glass fiber impregnation, said fluorinated surfactants can go into the environment, for example through the washing effluents, or disperse in the atmosphere during the drying and/or sintering steps. However some of said surfactants have been classified as dangerous for the environment and are characterized by a low bioelimination rate by the human body. For example, PFOA seems to belong to surfactants particularly harmful for the environment and with long residence times in men. Therefore the users of fluoropolymer dispersions request these substantially fluorinated anionic surfactnt free and in particular PFOA free.

Generally the fluoropolymer dispersions are obtained by the emulsion polymerization process having a fluorinated polymer concentration between 20 and 35% by weight referred to 100 parts by weight of the dispersion.

The fluoropolymer dispersions obtained from the polymerization process can be subjected to post-treatments to obtain concentrated fluoropolymer dispersions, also up to 75% w/w. The concentration processes can be carried out, for example, by a decantation process, as described, for example, in U.S. Pat. No. 3,037,953, U.S. Pat. No. 3,704,272 and U.S. Pat. No. 3,301,807. In these patents no reference is made to the PFOA reduction in the obtained fluoropolymer dispersions.

Another concentration process of the fluoropolymer dispersions is the so called ultrafiltration process as described, for example, in U.S. Pat. No. 6,136,893 and U.S. Pat. No. 4,369,266. U.S. Pat. No. 4,369,266 describes also a variation of the ultrafiltration process allowing to obtain aqueous fluoropolymer dispersions substantially fluorinated anionic surfactant free, for example PFOA free.

This process is based on the dialysis of the fluoropolymer dispersions and the permeate is purified from PFOA by using anionic exchange resins. This process can be industrially carried out. The drawback of this process is due to the fact that the dialysis process is slow, in particular to obtain fluoropolymer dispersions having a very low PFOA content, lower than 10 ppm referred to the polymer weight.

It is also known a process for obtaining polymeric dispersions substantially PFOA free by direct contact of the dispersion stabilized, with nonionic emulsifiers, with anionic exchange resins. See for example U.S. Pat. No. 3,536,643, EP 1,155,055, WO 03/051988. This process allows to obtain dispersions substantially PFOA free with a good productivity, however it has the drawback that a part of the fluoropolymer particles can remain in the anionic exchange resins when this process is industrially carried out. This drawback can occur when the stabilized fluoropolymer dispersion is not sufficiently stabilized, for any reason, and therefore with formation of coagulum. Or because a physical fluoropolymer trapping takes place. This implies a fluoropolymer loss and above all prevents the resin regeneration process with the drawback of the disposal of the exhausted resins.

Patent application DE 100 18 853 describes a process for obtaining dispersions substantially PFOA free by distillation of the dispersion having a pH between 1 and 3. Said process has the drawback to imply a strong destabilization of the dispersion and a high formation coagulum probability. Besides, there is the drawback of formation of a remarkable amount of foam causing problems for the industrial process.

The need was felt to have available a process for obtaining fluoropolymer dispersions substantially fluorinated surfactant free, in particular fluorinated anionic surfactant free capable to overcome the drawbacks of the processes of the above prior art having high productivity, and without formation of significant amounts of coagulum or foams.

It has been found by the Applicant a process allowing to solve the above technical problem.

An object of the present invention is a process for preparing fluoropolymer dispersions, preferably based on tetrafluoroethylene (TFE) homopolymers or TFE copolymers, substantially anionic fluorinated surfactant free, comprising the following steps:

step a1)

to a fluoropolymer dispersion obtainable by an emulsion or microemulsion polymerization process it is added:
a nonionic surfactant having cloud point (CP) between 40° and 80° C., in an amount from 1.5% to 50% by weight, preferably from 2.5% to 30% by weight with respect to the fluoropolymer of the dispersion;

step a2)

heating of the dispersion obtained in step a1) up to a temperature $T_c$ comprised in the range CP±10° C., preferably in the range CP±5° C., CP being the cloud point of the used nonionic surfactant;

step a2")

decantation in a reactor at the temperature $T_c$, until obtaining the separation of the dispersion in:

a lower aqueous phase formed of the concentrated fluoropolymer dispersion, wherein the fluoropolymer concentration is in the range 40%-75% w/w, preferably 60%-75% w/w, an upper aqueous phase (surnatant) substantially fluoropolymer free;

step a3)

washing of the decanted dispersion obtained in a2") with a solution of water and nonionic surfactant, preferably preheated at the temperature $T_c=CP\pm 10°$ C., preferably comprised in the range $CP\pm 5°$ C., CP being the cloud point of the used nonionic surfactant; wherein the concentration by weight of the surfactant in the solution ranges from 0.5% to 50% by weight, preferably from 1% to 30% by weight with respect to the dispersion; the washing solution comprising water and surfactant is continuously input into the reactor from its lower part, the rate of the washing solution in the reactor from the bottom upwards being lower than the decantation rate of the fluoropolymer particles;

in the exchange zone the washing solution is in countercurrent with respect to the decantation motion of the fluoropolymer particles, the amount of the washing solution introduced into the reactor, referred to the amount of fluoropolymer present in the reactor, is higher than 0.5 liters of washing solution/kg of fluoropolymer, preferably higher than 1 l/kg of fluoropolymer, still more preferably higher than 3 l/kg of fluoropolymer;

the temperature $T_c$ at which the process is carried out and the input rate of the washing solution must be such as to maintain substantially unchanged the separation of the two phases, obtained in step a2") by decantation, during all the subsequent process steps;

step a4)

the upper aqueous phase is continuously removed from the upper part of the reactor, preferably the volume of the removed aqueous phase is equal to the fed volume of washing solution introduced in step a3);

step a5)

discharge and recovery of the lower phase containing the fluoropolymer dispersion, preferably concentrated, the discharge taking place when from the upper part of the reactor at least the amount of washing solution fed in step a3) flows out; optionally when the discharge starts, additional dispersion can be fed repeating step a1) and a2).

In step a3) the height H1 of the exchange zone (see FIGS. 3 and 4, which represent preferred embodiments of the process) is generally between 1/10 and 50 times the reactor diameter, preferably between 1/4 and 10 times, still more preferably between 1/2 and 5 times.

As said, fluoropolymer aqueous dispersions substantially fluorinated surfactant free meant that the content of fluorinated surfactants referred to the fluoropolymer weight is lower than 100 ppm, in particular lower than 50 ppm, more in particular lower than 5 ppm.

The exchange zone of H1 height of step a3) is the reactor part wherein the contact of the washing solution takes place (water containing the nonionic surfactnt) with the decanted fluoropolymer dispersion. It is delimited in the lower part by the washing solution input, as defined in step a3), in the upper part by the surnatant, as obtained after the decantation of step a2"). Optionally in the exchange zone between the dispersion and the washing solution, a mixing or a mixing system can be supplied to favour the contact of the two phases, fed in countercurrent. Said mixing can be carried out by using a static filling or by using plates in the reactor or by using a stirrer. The usable plates are as those of an extraction column. Mixing can also be obtained by a slow stirring, for example with a blade stirrer, or by a recycle of the dispersion present in the exchange zone. The static filling can be obtained, for example, by using rings of inert material, under the process conditions; for example rings of ceramic, plastic material, stainless steel, metal alloys, or structured fillings can be mentioned.

In step a1 ) the following components can optionally be added:

an electrolyte in amount to bring the specific conductivity of the dispersion, measured at 25° C., to values between 130 and 8,000 μS/cm, preferably between 250 and 3,000 μS/cm;

a hydrogenated anionic surfactant, to improve the shear stability of the dispersion, in concentration lower than 5% by weight, preferably lower than 1% by weight, more preferably lower than 0.1% by weight on the dispersion;

an anionic hydrogenated polyelectrolyte, preferably lower than 1% by weight, more preferably lower than 0.1% by weight on the dispersion;

a buffer agent to have a pH between 2 and 12, preferably between 3 and 10.

After step a1), the optional step a2') can be carried out, wherein:

the dispersion obtained in a1) is diluted with water until obtaining a concentration of 5-10% by weight of fluoropolymer, optionally said dispersion is heated under stirring up to a temperature $T_c$ in the range $CP\pm 10°$ C., preferably in the range $CP\pm 5°$ C.;

optionally it is left under stirring for a time between about 10 minutes and about 2 hours.

By operating under the conditions described in the process of the invention in step a4), generally the upper aqueous phase does not contain fluoropolymer or, if present, it is in very low amounts, for example lower than 1% by weight.

In step a4) the aqueous phase removed from the reactor can be sent to an anionic exchange resin column or into a reactor containing said resins to recover the fluorinated anionic surfactant, and, after this treatment, the solution can be re-used in the process, optionally adding the nonionic surfactant up to the concentrations indicated in step a1). The aqueous solution containing the nonionic surfactant, after passing on the ionic exchange resins, is preferably concentrated, for example by reverse osmosis, before being reused in the process of the invention. In this way no substantial loss of nonionic surfactant takes place. Instead of the anionic exchange resins, other adsorbers, as for example alumina and/or activated carbon, can be used.

In particular the invention process can be carried out in semi-batch or in a continues way.

The semi-batch process comprises the above steps, wherein, in step a1) (step a1sb), to a fluoropolymer dispersion obtainable with an emulsion or microemulsion polymrization process, fed into a reactor, the nonionic surfactant indicated in step a1) is added; then the other steps from a2) to as) follow.

Preferably step a5) in the semi-batch process (step a5sb), is carried out as follows:

stopping both the washing solution feeding in the lower part of the reactor and the output of the aqueous phase from the upper part of the reactor, when from the upper part of the reactor an amount of washing solution equal to that introduced in step a3) has flown out;

sedimentation of the dispersion until the desired value of fluoropolymer concentration, substantially PFOA free, is obtained;

discharge of the concentrated fluoropolymer dispersion;
input into the reactor of an additional aliquot of polymerization dispersion to be treated and repetition of steps of the semi-batch process of the invention.

According to this embodiment of step a5) in the semibatch process (step a5sb)), also the concentration step takes place in the reactor. This represents an advantage from the industrial point of view.

In FIG. 1 a plant scheme for this kind of process is illustrated. The FIG. 1 is described afterwards in detail. The process illustrated in FIG. 1 represents a preferred embodiment of the process of the present invention.

The continuous process under steady conditions comprises the following steps:

steps a1) and a2) are carried out in a pre-reactor or in line and the so obtained dispersion is fed into the reactor approximately in the separation zone between the upper surnatant aqueous phase and the lower aqueous phase containing the fluoropolymer; step a2") takes place in the reactor in a continuous way. Steps a3) and a4) are repeated while in step a5) the discharge is carried out in a continuous way.

Figure 4:
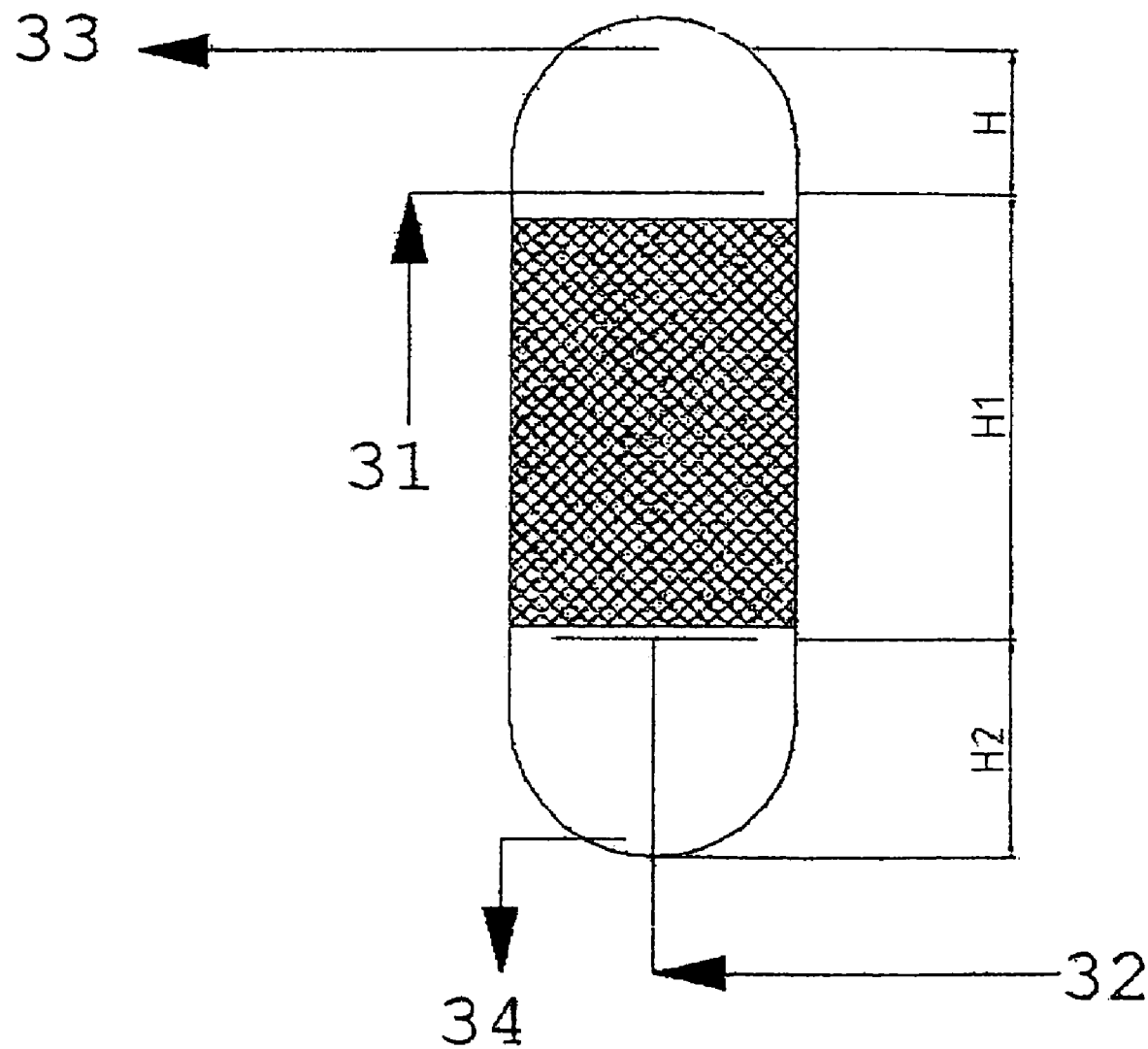

Generally the height H, see FIG. 4, at which the dispersion feeding takes place, measured starting from the reactor top, is between 1/10 and 1 time the reactor diameter.

In the continuous process there are:
two inputs, respectively the fluoropolymer dispersion and the washing solution,
two outputs, respectively the washing solution which has passed through the dispersion and the discharge of the fluoropolymer dispersion, substantially PFOA free. Under steady conditions the total amount of the aqueous phase entering the reactor (washing solution+ fluoropolymer dispersion to be purified) is equal to the total amount of the aqueous phase leaving the reactor (aqueous phase substantially fluoropolymer free+discharge of the fluoropolymer dispersion substantially PFOA free). If desired to obtain at the discharge a concentrated fluoropolymer dispersion, the washing solution is fed at a height H2 (see FIG. 4) on the reactor, measured from the reactor bottom, equal to from about 1/10 to 1 time the reactor diameter.

As said, both in the semi-batch process and in the continuous process, the temperature $T_c$ of the process, the input rate of the washing solution, the input rate of the fluoropolymer disperion and optionally the mixing conditions in the exchange zone, must be such that the separation of the two phases obtained after decantation (step a2") is maintained substantially unchanged during all the process steps. In this way there is a remarkable advantage in comparison with the other prior art processes, as the fluoropolymer loss in the output waters from the upper part of the reactor is negligible. It has been surprisingly and unexpectedly found by the Applicant that an advantageous way to maintain substantially unchanged the separation level obtained by decantation is that to measure the height of said separation line (area) and, if it moves during the process of the invention, the washing solution flow is varied so as to bring again said separation line in the initial zone. In practice, if the level rises, the washing solution flow is lowered and viceversa.

Figure 2:
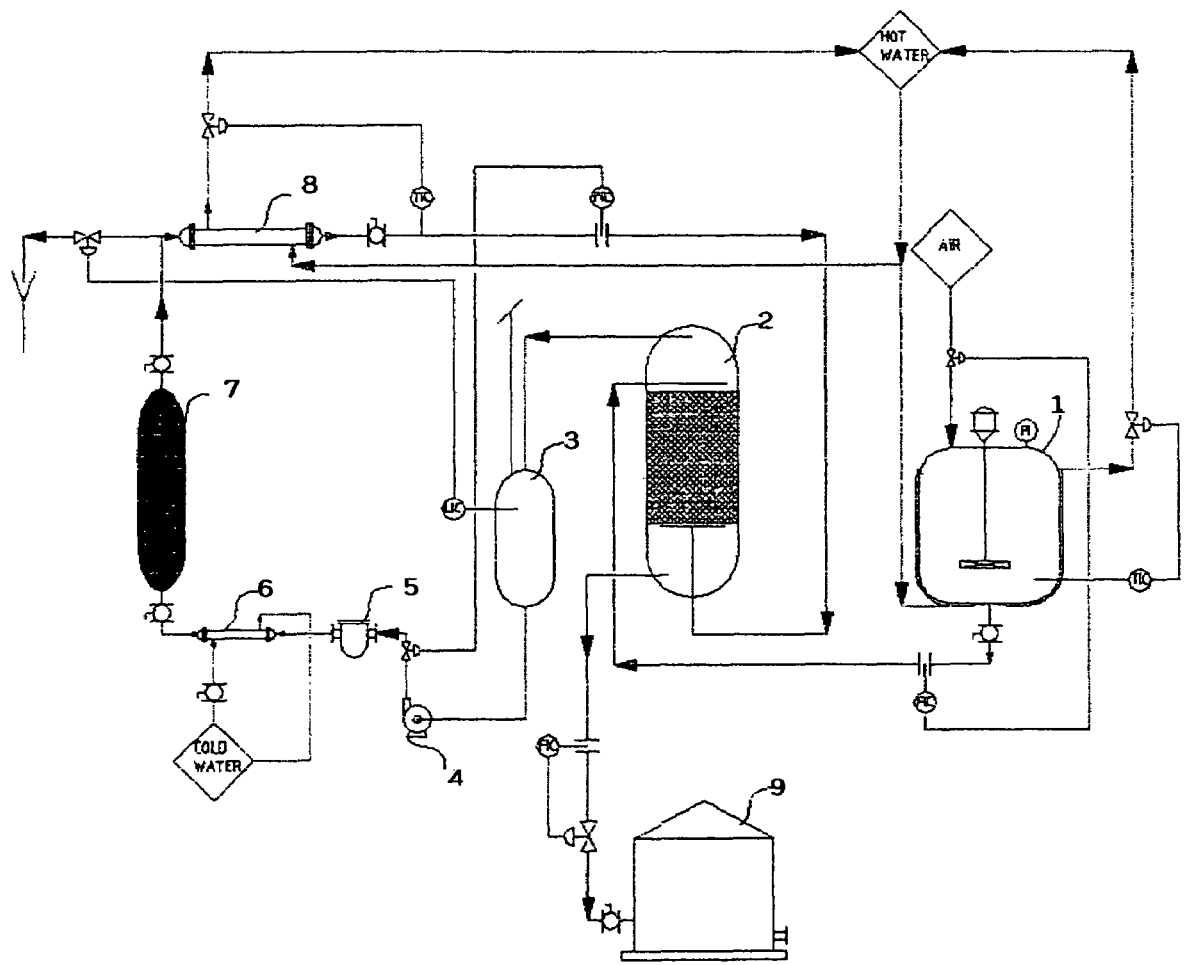

In FIG. 2 a plant scheme for this kind of process is represented and it is described hereinafter in detail. The process in FIG. 2 represents a preferred embodiment of the process of the present invention.

The starting step of the continuous process according to the present invention can be carried out by using a semi-batch process, for example that described above.

As said above, both in the semi-batch process and in the continuous process, the washing solution flow in step a3) can vary in the time, for example it can be increased or decreased.

The process of the present invention has the advantage to allow to obtain a fluoropolymer dispersion PFOA free in reduced times, thus with a higher productivity. Besides the management of the plant of the present invention, as for example represented in FIG. 2, is rather simplified.

The CP value and the concentrations of the anionic fluorinated surfactant and of the nonionic surfactant are measured by well known analytical methods of the prior art. See the methods reported in the Examples.

The fluoropolymer dispersions obtainable with an emulsion, or microemulsion polymerization process, usable in step a1) of the present invention, generally have the following characteristics:
particle diameter from 10 nm to 400 nm, preferably from 20 nm to 300 nm,
fluoropolymer concentration from 10% to 45% by weight, preferably from 20% to 35%,
amount of fluorinated anionic surfactant between 800 ppm and 10,000 ppm, preferably between 1,200 ppm and 6,000 ppm referred to the polymer weight.

From the industrial point of view the polytetrafluoroethylene (PTFE) dispersions obtainable with an emulsion polymerization process typically have an amount of fluorinated anionic surfactant between about 2,500 ppm and about 5,000 ppm, preferably between 3,000 ppm and 4,000 ppm referred to the polymer weight.

In the process of the invention mixtures of nonionic surfactants can also be used, provided that the CP of the resulting mixture be in the range indicated in step a1). One or more surfactants with CP values in the range indicated in step a1) can also be used. In general the CP of the resulting mixture, when more surfactants are used, is measured or can be determined by weighed averaging of the used surfactants.

The nonionic surfactants used in the process of the present invention having cloud point (CP) in the range 40° C.-80° C. are known in the prior art. The book "Nonionic surfactants", Ed. M. J. Schick, Marcel Dekker 1967, pages 76-85 and 103-141 can, for example, be mentioned. Preferably the nonionic surfactants used in the process of the present invention have CP from 45° C. to 70° C. Among nonionic surfactants polyethoxylated alcohols and polyethoxylated alkylphenols, optionally containing one or more units of propylene oxide are particularly preferred; polyethoxylated alcohols are the most preferred.

The following surfactants are those still more preferred:

Triton®X100 (Dow), having formula:

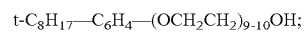
t-C$_8$H$_{17}$—C$_6$H$_4$—(OCH$_2$CH$_2$)$_{9\text{-}10}$OH;

Tergitol®TMN100x (Dow), having formula:

sec-C$_{12}$H$_{25}$—(OCH$_2$CH$_2$)$_{10\text{-}1}$OH;

Antarox®863 (Rhodia), having formula:

iso-C$_{13}$H$_{27}$—(OCH$_2$CH$_2$CH$_2$)—(OCH$_2$CH$_2$)$_{10}$—OH;

Rhodasurf®870 (Rhodia), having formula:

iso-C$_{13}$H$_{27}$—(OCH$_2$CH$_2$)$_{10}$—OH;

Genapol®X080 (Clariant), having formula:

iso-C$_{13}$H$_{27}$—(OCH$_2$CH$_2$)$_8$—OH.

The preferred electrolytes used in the present invention are ammonium and/or alkaline metals salts or hydroxides. The following ones are still more preferred: ammonium sulphate, ammonium bisulphate, ammonium carbonate, ammonium hydroxide.

The process of the present invention can be used for the purification from fluorinated anionic surfactants also for the fluoropolymer dispersions containing more than 10,000 ppm of said surfactants, referred to the polymer weight.

Among the anionic exchange resins usable in the process of the present invention those described in "Kirk-Othmer—Encyclopedia of Chemical Technology", vol. 14, pages 737-783, J. Wiley & Sons, 1995, can be mentioned. Among the preferred anionic exchange resins, the resins containing a tertiary or quaternary ammonium group can be mentioned. Among the preferred commercial resins, Amberjet®4400 OH (Rohm&Haas) and Dowex®MSA 1-C (Dow) can be mentioned.

As said, as solid adsorbers, activated carbons, alumina, silicas, inorganic hydroxides having low solubility in water, for example magnesium and calcium hydroxide can be mentioned.

Among the buffer agents usable in the process of the present invention, the well known organic or inorganic buffer systems of the prior art can be mentioned, as those formed of a weak acid in the presence of one of its salts with a strong base, as $CH_3COOH/CH_3COONa$, $NaHCO_3/Na_2CO_3$, or those formed of a weak base in the presence of one of its salts with a strong acid, for example $NH_4OH/NH_4Cl$.

The optional hydrogenated anionic surfactants usable in the process of the invention are preferably selected from the following classes of compounds:

anionic surfactants having the following general formula:

$$Y'—(P^1)_n—CH(Y)—(P^2)_{n'}—Y''\quad(1)$$

wherein:
Y, Y' and Y" are anionic or nonionic groups, with the proviso that at least one of Y, Y' or Y" is an anionic group and at least one of the remaining of Y, Y' or Y" is a nonionic group;
$p^1$ and $p^2$, equal or different, are linear or branched alkylene groups, optionally containiang one or more unsaturations, having a number of carbon atoms from 1 to 10, preferably from 1 to 6;
n and n', equal or different, are zero or 1;
anionic surfactants having the following general formula:

$$T—(O)_{n6}—[(CH_2)_{n3}—CH_2CH_2O]_{n4}—(CH_2)_{n5}—X\quad(2)$$

wherein:
T= $C_{4-18}$ alkyl, or aryl wherein one or more hydrogen atoms are substituted with $C_{4-18}$, preferably $C_{6-12}$, aliphatic chains;
n3, n6, equal to or different from each other, are integers equal to 0 or 1;
n4 is an integer and varies from 0 to 100, preferably from 1 to 50, still more preferably from 2 to 30;
n5 is an integer from 0 to 10, preferably from 0 to 1;
X is an anionic group selected from $COO^-$, $SO_3^-$;
with the proviso that when n5=0 X=$SO_3^-$.

The preferred anionic groups in the surfactants of formula (1) are selected from $SO_3^-$, $HPO_3^-$ and $COO^-$. Generally the corresponding cations are selected from H+ or those of the alkaline metals, ammonium ion or substituted ammonium; the most preferred anionic group is $SO_3^-$ salified with a cation of an alkaline metal, ammonium ion or substituted ammonium.

The preferred nonionic groups in the surfactants of formula (1) are selected from the following:
COOR, CONHR, $CONH_2$, CONRR', wherein:

R and R' equal or different, have the following meanings:
$C_2-C_{20}$, preferably $C_5-C_{15}$, more preferably $C_7-C_{15}$, linear or branched hydrogenated alkyls, saturated or containing at least one unsaturation, preferably of ethylene type; when the alkyl has a number of carbon atoms of at least 6, it can contain one or more aroamtic rings; in the alkyl group one or more hydrogen atoms can be substituted by fluorine or chlorine atoms, the hydrogenated (hydrocarbons) alkyl groups are preferred;
alkyl siloxane groups, wherein the alkyl contains from 1 to 7 carbon atoms, preferably the alkyl is methyl.

In the surfactants of formula (1) COOR is preferred among the nonionic groups, wherein R is as above; when in the compound of formula (1) two nonionic COOR groups are present, the alkyl group in each of the COOR groups can be equal to or different from the other.

Preferably in formula (1) Y is an anionic group and Y', Y" are nonionic groups, equal to or different from each other; one between n and n' has the value of 1 and the other of zero; when n or n' is different from zero, $p^1$ or $p^2$ is methylene.

Among the surfactants of formula (1) those having the following structures are preferred:
$C_{10}H_{21}OOC—CH_2—CH(SO_3^-)—COOC_{10}OH_{21}$
di-isodecylsulphosuccinate sodium salt, known with the trademark EMULSOGEN® SB10 (Clariant);
$C_{13}H_{27}OOC—CH_2—CH(SO_3Na)—COOC_{13}H_{27}$di-isotridecylsulphosuccinate sodium salt, known with the trademark POLIROL® TR/LNA; (CESALPINIA Chemicals).

The counterions of the surfactants of formula (2) are generally those indicated above for the anionic surfactants of formula (1).

Among the surfactants of formula (2) those having the following structures are preferred:
$(C_9H_{17})_2—C_6H_3—O—[CH_2CH_2O]_{15-20}—(CH_2)—$
COOH dinonylphenolpolyethylenglycolether carboxylic acid, known with the trademark Marlowet® 4530 (Sasol);
$(C_{12-14}H_{25-29})—O—[CH_2CH_2O]_{10}—(CH_2)—COONa$
$C_{12}—C_{14}$—alcohol polyethylenglycol ether (10EO) carboxymethylated sodium salt, known with the trademark Marlinat®105/80 (Sasol);
$(C_{12-14}H_{25-29})—O—[CH_2CH_2O]_3—SO_3Na$ $C_{12}-C_{14}$-alcohol polyethylenglycol ether (3EO) sulphate sodium salt known with the trademark Cosmacol® AES- 27-3-24 NE (Sasol).

One or more surfactants of the above classes can also be used.

The polymerization processes to obtain the dispersions to be used in step a1) of the process of the present invention are the emulsion or microemulsion polymerization processes.

The emulsion polymerization processes are described in the following patents: U.S. Pat. No. 2,559,752, U.S. Pat. No. 4,380,618, U.S. Pat. No. 5,789,508, U.S. Pat. No. 6,479,591, U.S. Pat. No. 6,576,703 and in patent application US 2003/0153674. The microemulsion polymerization processes are described in the following patents in the name of the Applicant: U.S. Pat. No. 4,864,006 and U.S. Pat. No. 6,297,334. The microemulsions usable in the microemulsion polymerization processes are described in U.S. Pat. No. 4,864,006 and U.S. Pat. No. 4,990,283.

The fluoropolymers of the dispersions used in the process of the present invention are for example:
tetrafluoroethylene (TFE) homopolymers and TFE copolymers with monomers having at least one unsaturation of ethylene type;

thermoprocessable fluoropolymers (from the melt) based on TFE as PFA, MFA, FEP and ETFE;
VDF-based homopolymers and copolymers;
CTFE-based homopolymers and copolymers, for example PCTFE and E/CTFE copolymer;
VDF-based fluoroelastomers:
  VDF/HFP, optionally containing TFE and/or vinylethers selected from perfluoroalkylvinylethers and/or perfluoroalkoxyalkylvinylethers; optionallky containing hydrogenated olefins as ethylene and propylene;
TFE-based (per)fluoroelastomers:
  TFE copolymers with vinylethers selected from perfluoroalkylvinylethers and/or perfluoroalkoxyalkylvinylethers; in particular TFE/PMVE, TFE/PEVE, TFE/PPVE;
  TFE copolymers with hydrogenated olefins, preferably ethylene and/or propylene;
amorphous and/or crystalline TFE and/or VDF fluoropolymers containing dioxole rings having 5-7 atoms, in particular those obtained by copolymerization with (per)fluorodioxoles or with dienic monomers giving dioxole rings by cyclization.

The tetrafluoroetilene (TFE) copolymers with monomers having at least one unsaturation of ethylene type comprise comonomers both of hydrogenated and fluorinated type. The comonomer amount is preferably lower than 3% by weight, preferably lower than 1% to have non thermoprocessable copolymers (the so called modified PTFE).

Among the hydrogenated comonomers, ethylene, propylene, acrylic monomers, for example methylmethacrylate, (meth)acrylic acid, hydroxyethylenacrylate, styrene monomers, as styrene can be mentioned.

Among the fluorinated comonomers there can be mentioned:
  $C_3$-$C_8$ perfluoroolefins, as hexafluoropropene (HFP);
  $C_2$-$C_8$ hydrogenated fluoroolefins, as vinyl fluoride (VF), vinylidene fluoride (VDF), trifluoroethylene, $CH_2=CH-R_{f0}$ perfluoroalkylethylene, wherein $R_{f0}$ is a $C_1$-$C_6$ perfluoroalkyl;
  $C_2$-$C_6$ choro- and/or bromo- and/or iodo-fluoroolefins, as chlorotrifluoroethylene (CTFE);
  $CF_2=CFOR_{f0}$ (per)fluoroalkylvinylethers (PAVE), wherein $R_{f0}$ is a $C_1$-$C_6$ (per)fluoroalkyl, for example $CF_3$, $C_2F_5$, $C_3F_7$;
  $CF_2=CFOX_0$ (per)fluoro-oxyalkylvinylethers, wherein $X_0$ is a $C_1$-$C_{112}$ alkyl, or a $C_1$-$C_{12}$ oxyalkyl, or a $C_1$-$C_{12}$ (per)fluorooxyalkyl having one or more ether groups, for example perfluoro-2-propoxy-propyl;
  fluorodioxoles, preferably perfluorodioxoles.

The preferred fluoropolymers of the dispersions obtainable by emulsion or microemulsion polymerization, usable in the process of the present invention, are the TFE copolymers or the PTFE homopolymers.

The starting fluoropolymer dispersion can be monomodal or bi- or multimodal. For the bi- and multimodal dispersions see for example U.S. Pat. No. 6,576,703, U.S. Pat. No. 6,518,352 in the name of the Applicant.

The process of the present invention, as said, is characterized by a high productivity and substantially there are no fluoropolymer losses.

The fluoropolymer dispersions substantially fluorinated anionic surfactant free obtained with the process of the present invention are characterized by a good stability to shear and can be used in the usual applications for this kind of fluoropolymer dispersions. The dispersions obtained with the process of the invention, per se or formulated, can also be used for the coating of surfaces of organic and/or inorganic polymers, of metals or ceramics, for the impregnation of glass fibers, the cast film production, for the additivation of polymers or inorganic materials, etc.

Figure 3:
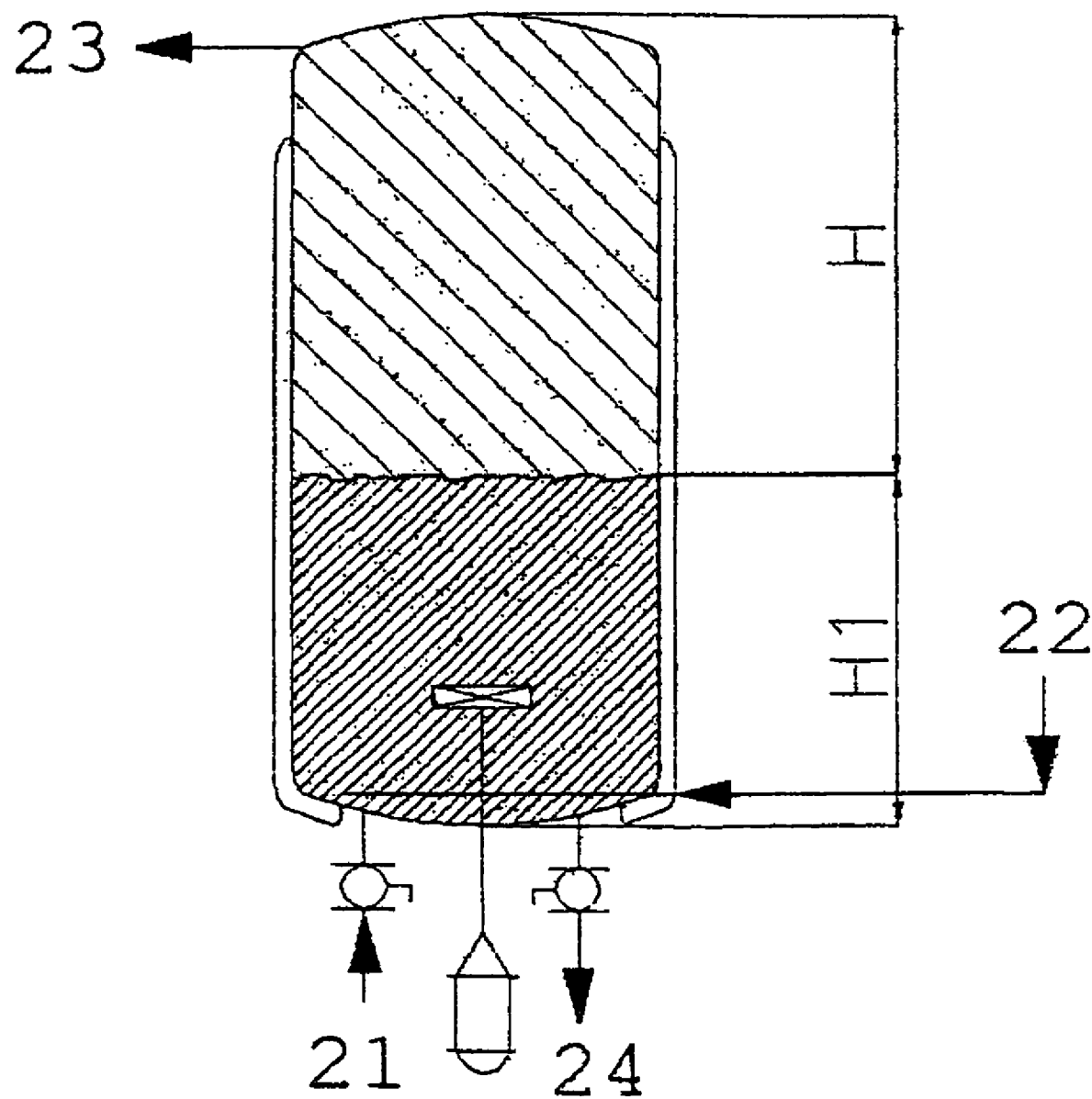

In the enclosed Figures, representing preferred embodiments of the present invention, there are reported:
FIG. 1: semi-batch process;
FIG. 2: continuous process;
FIG. 3: detailed representation of the reactor 2 of FIG. 1.
FIG. 4: detailed representation of the reactor 2 of FIG. 2.

In FIG. 1, 1 is the storage tank of the fluoropolymer dispersion obtained by polymerization; 2 is the reactor wherein the purification of the polymeric dispersion takes place; 3 is a collecting tank of the aqueous phase substantially fluoropolymer free flowing out from the upper part of reactor 2; 4 is a pump for liquids; 5 is an optional filter, to separate possible coagula; 6 is an optional heat exchanger to cool the aqueous phase before the treatment on resins or solid adsorbers; 7 represents a column containing resins or solid adsorbers; 8 is a heat exchanger used to bring the aqueous phase, to be recycled into the reactor 2, to the temperature indicated in step a3), optionally and preferably concentrated before 8; 9 is a collecting tank for the latex (fluoropolymer dispersion) substantially PFOA free and optionally concentrated.

In FIG. 2, 11 indicates the prereactor used for steps a1) and a2); 12 indicates the reactor wherein the purification from the anionic fluorinated surfactant of the polymer dispersion takes place; 13 is a collecting tank of the aqueous phase substantially fluoropolymer free flowing out from the upper part of the reactor 12; 14 is a pump for liquids; 15 is an optional filter to separate possible coagula; 16 is an optional heat exchanger to cool the aqueous phase before the treatment on resins or solid adsorbers; 17 represents a column containing resins or solid adsorbers; 18 is a heat exchanger used to bring the aqueous phase, recycled in the reactor 12, to the temperature indicated in step a3), optionally it is preferably concentrated before 18; 19 is a collecting tank for the latex (fluoropolymer dispersion) substantially PFOA free and optionally concentrated.

In FIG. 3, 21 represents the input of the dispersion to be purified; 22 represents the input of the washing solution containing the nonionic surfactant; 23 is the surnatant output; 24 is the purified dispersion output; H1 represents the height of the exchange zone and H the height of the surnatant.

In FIG. 4, 31 represents the dispersion input to be purified; 32 represents the input of the washing solution containing the nonionic surfactant; 33 is the surnatant output; 34 is the purified dispersion output; H1 represents the height of the exchange zone, H the height of the surnatant, H2 the height of the optional concentration zone.

The purified dispersions obtainable with the process of the present invention generally contain a coagulum in amounts lower than 0.1% by weight, preferably lower than 0.01% by weight, still more preferably lower than 0.005% by weight referred to the fluoropolymer weight.

The following Examples illustrate with non limitative purposes the present invention.

EXAMPLES

The percentages reported in the Examples are percentages by weight.

Determination of the Average Particle Diameter in the Latex

The average particle diameter is measured by an instrument based on laser light scattering, in particular on Photon Correlation Spectroscopy, equipped with Brookhaven correlator 2030 AT model and Argon laser light source having a wave length of 514.5 nm by Spectra-Physics. The latex samples to be subjected to measurement are diluted with water filtered at 0.2 µm on Millipore filter. The scattering measurement is carried out at room temperature (20° C.) at an angle of 90°. The latex particle diameter is obtained by the cumulant method.

Determination of the Dry Product Content (Polymer) in the Polymerization Latex 20 grams of latex are weighed in a glass beaker and placed in a stove to dry for 1 hour at 150° C. The latex dry content is obtained by the formula:

Dry product %=weight after drying/latex initial weight*100.

Determination of the Polymer Content and of the Nonionic Surfactant in the Concentrated Dispersions About 1 gram of concentratd dispersion is weighed in an aluminum shuttle and dried in a stove for 1 hour at 105° C. The shuttle is weighed and introduced in a muffle at the temperature of 400° C. for 10 minutes (sintering). At the end the shuttle is weighed again.

The polymer content of the concentrated dispersion is obtained by the formula:

$$\text{Polymer } \% = \frac{\text{weight after sintering}}{\text{initial dispersion weight}} * 100$$

The nonionic surfactant content of the concentrated dispersion is obtained by the formula:

$$\text{surfactant } \% = \frac{\text{weight after drying} - \text{weight after sintering}}{\text{initial dispersion weight}} * 100$$

PFOA Determination

The quantitative determination of the PFOA content in the dispersion is carried out with the method described in "Encyclopedia of Industrial Chemistry Analysis", vol. 1, pages 339-340, Interscience Publishers, New York, N.Y., 1971, and in EP-A 194,690.

PFOA is converted into methyl ester and the ester content gaschromatographically analyzed. The method sensitivity limit is 5 ppm.

Determination of the Cloud Point (CP) of a Nonionic Surfactant

The CP is determined according to the standard EN 1890 Method A, at a concentration 1% w/w in water of the nonionic surfactant.

Determination of the Specific Conductivity

The specific conductivity is determined at the temperature of 25° C., by Crison 525 conductimeter.

Determination of the Cocnentration of the Nonionic Surfactant in the Surnatant Aqueous Phase The determination is carried out as above for the determination of the content of the polymer and the nonionic surfactant in the concentrated dispersions. In this case, as there is not the polymer, the dry residue obtained after drying in a stove for 1 hour at 105° C. gives the per cent of the surfactant amount in the considered aqueous dispersion volume. Alternatively and depending on the kind and the structure of the nonionic surfactant to be determined, well knwon specific methods of the prior art, as the spectrophotometric, potentiometric analysis, etc., can be used.

Determination of the Coagulum Amount Present in the Dispersion, Calculated with Respect to the Polymer 500 g of dispersion are filtered through a nylon net having a known weight with mesh equal to 50 µm. At the end of the filtration 500 ml of water are passed through the net to remove the dispersion in excess. The net with the possible residue is dried in a stove at 105° C. for 1 hour and is then weighed. The coagulum amount is determined by difference with respect to the initial net weight. By dividing the difference by the polymer amount contained in 500 g of dispersion and multiplying by 100, the coagulum percentage in the polymer is obtained.

The sensitivity limit of the method is 0.005% by weight on the polymer.

Example 1

Polymerization 11 grams of the aqueous solution of ammonium perfluorooctanoate at a concentration of 100 g/litre and 31 litre of demineralized water accurately degassed are introduced in a 50 litre autoclave equipped with a mechanical stirrer and previously put under vacuum. Also 140 grams of paraffin with softening point between 52° C. and 54° C. were previously introduced in the reactor. The autoclave is kept under mechanical stirring and is pressurized with TFE up to a 20 bar pressure at a temperature of 68° C. At this point 500 ml of a solution of $(NH_4)_2S_2O_8$ (APS) and disuccinic perodxide (DSAP) corresponding to 400 mg of APS and 2,000 mg of DSAP are fed into the autoclave.

When the pressure in the reactor has decreased of 0.5 bar, one starts to feed TFE by a compressor so as to maintain a constant pressure of 20 bar. In the meantime the internal reactor temperature is increased up to 78° C. at a rate of 0.5° C./min. During the reaction 50.6 grams of the aqueous solution at 100 g/litre of ammonium perfluorooctanoate are fed into the autoclave. After 90 minutes the TFE feeding is interrupted, when 15,800 grams of TFE have reacted, the reactor evacuated and cooled. The discharged latex has a solid content equal to 30% w/w.

The primary particle diameter of the polymer measured by Laser Light Scattering (LLS) is equal to 248 nm.

The PFOA content is 3,900 ppm with respect to the polymer.

Example 2

Purification process in semi-batch 46.8 Kg of the dispersion obtained in the Example 1 are transferred in the tank 1 (FIG. 1) and 11 Kg of a Triton® X-100 solution at 25% by weight and 23 Kg of ammonium sulphate are added thereto. 13.8 liters of the so obtained mixture are homogenized and then fed to the reactor 2 having a 13.8 litre volume, wherein it is heated to the temperature of 69° C. under stirring. When the thermal equilibrium has been reached, the stirring is stopped and the separation in two phases is observed in a short time, a concentrated latex phase on the reactor bottom and an upper limpid aqueous phase. At this point an aqueous Triton® X-100 solution at 7% by weight, initially contained in the tank 3, is introduced in the reactor 2 with a flow-rate of 3.6 liters/h by a pump 4 crossing first the ionic exchange column 7 at a temperature lower than 25° C. because of the exchanger 6, and being then heated before the input in reactor 2 at the temperature of 68° C. by the exchanger 8. The content of the tank 3 is then continuously reintegrated from the upper limpid phase present in the reactor 2. During this process the lower latex phase present in the reactor 2 is maintained under a very slow stirring. After 12 hours, when 43.2 liters of aqueous Triton® X-100 solution have passed, pump 4 and the stirring in the tank are stopped. The dispersion is allowed to decant for 15 minutes and then discharged.

The discharged dispersion contains, as per cent by weight: PTFE 68.7%, Triton® X-100 2.2%, PFOA<5 ppm. The dispersion is stable and without coagulum. The discharged dispersion is formulated to obtain a dispersion containing as per cent by weight: PTFE 60%, Triton® X-100 3.75%, pH=9.6. The so obtained dispersion is used for the impregnation of glass cloth. The application test gives a very good result.

The invention claimed is:

1. A process for preparing fluoropolymer dispersions based on tetrafluoroethylene (TFE) homopolymers or TFE copolymers that are substantially anionic fluorinated surfactant free, comprising the following steps:
   step a1) to a fluoropolymer dispersion obtainable by an emulsion or microemulsion polymerization process it is added: a nonionic surfactant having cloud point (CP) between 40° and 80° C., in an amount from 1.5% to 50% by weight with respect to the fluoropolymer of the dispersion;
   step a2) heating of the dispersion obtained in step a1) up to a temperature $T_c$ in the range CP±10° C., CP being the cloud point of the used nonionic surfactant;
   step a2") decantation in a reactor at the temperature $T_c$, until obtaining the separation of the dispersion in: a lower aqueous phase formed of the concentrated fluoropolymer dispersion, wherein the fluoropolymer concentration is in the range 40%-75% w/w, an upper aqueous phase (surnatant) substantially fluoropolymer free;
   step a3) washing of the decanted dispersion obtained in a2") with a solution of water and nonionic surfactant; wherein the concentration by weight of the surfactant in the solution ranges from 0.5% to 50% by weight with respect to the dispersion; the washing solution comprising water and surfactant is continuously input into the reactor from its lower part, the rate of the washing solution in the reactor from the bottom upwards being lower than the decantation rate of the fluoropolymer particles; in an exchange zone the washing solution is in counter-current with respect to the decantation motion of the fluoropolymer particles, the amount of the washing solution introduced into the reactor, referred to the amount of fluoropolymer present in the reactor, is higher than 0.5 liters of washing solution/kg of fluoropolymer; the temperature $T_c$ at which the process is carried out, and the input rate of the washing solution must be such as to maintain substantially unchanged the separation of the two phases, obtained in step a2") by decantation, during all the subsequent process steps;
   step a4) the upper aqueous phase is continuously removed from the upper part of the reactor;
   step a5) discharge and recovery of the lower phase containing the fluoropolymer dispersion, the discharge taking place when from the upper part of the reactor at least the amount of washing solution fed in step a3) flows out; optionally when the discharge starts, additional dispersion can be fed repeating step a1) and a2).

2. A process according to claim 1, wherein in step a3) the height H1 of the exchange zone is between 1/10 and 50 times the reactor diameter.

3. A process according to claim 1, wherein in the exchange zone a mixing is required.

4. A process according to claim 3, wherein mixing is obtained by a slow mechanical stirring, recycle of the dispersion present in the exchange zone, by a filling or by plates.

5. A process according to claim 1, wherein in step a1) the following components are added: an electrolyte to bring the specific conductivity of the dispersion, measured at 25° C., to values between 130 and 8,000 μS/cm; a hydrogenated anionic surfactant in concentration lower than 5% by weight of the dispersion; an anionic hydrogenated polyelectrolyte; a buffer agent to have a pH between 2 and 12.

6. A process according to claim 5, wherein the electrolytes used are selected from the group consisting of ammonium and/or alkaline metals salts or hydroxides.

7. A process according to claim 5, wherein the buffer agents are organic or inorganic buffer systems formed of a weak acid in the presence of one of its salts with a strong base or those formed of a weak base in the presence of one of its salts with a strong acid.

8. A process according to claim 5, wherein the hydrogenated anionic surfactants are selected from the group consisting of: anionic surfactants having the following general formula:

$$Y'-(P^1)_n-CH(Y)-(P^2)_{n'}-Y'' \quad (1)$$

wherein: Y, Y' and Y" are anionic or nonionic groups, with the proviso that at least one of Y, Y' or Y" is an anionic group and at least one of the remaining of Y, Y' or Y" is a nonionic group; $p^1$ and $p^2$, equal or different, are linear or branched alkylene groups, optionally containing one or more unsaturations, having a number of carbon atoms from 1 to 10; n and n', equal or different, are zero or 1; anionic surfactants having the following general formula:

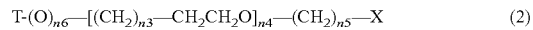

$$T-(O)_{n6}-[(CH_2)_{n3}-CH_2CH_2O]_{n4}-(CH_2)_{n5}-X \quad (2)$$

wherein: T=$C_{4-18}$ alkyl, or aryl wherein one or more hydrogen atoms are substituted with $C_{4-18}$ aliphatic chains; n3, n6, equal to or different from each other, are integers equal to 0 or 1; n4 is an integer and ranges from 0 to 100; n5 is an integer from 0 to 10; X is an anionic group selected from the group consisting of COO⁻ and $SO_3^-$; with the proviso that when n5=0 X=$SO_3^-$.

9. A process according to claim 1 wherein after step a1), step a2') is carried out, wherein: the dispersion obtained in a1) is diluted with water until obtaining a concentration of 5-10% by weight of fluoropolymer, said dispersion being optionally heated under stirring up to a temperature $T_c$ in the range CP±10° C.; optionally leaving it under stirring for a time between about 10 minutes and about 2 hours.

10. A process according to claim 1, wherein in step a4) the aqueous phase removed from the reactor is sent to an anionic exchange resin column or into a reactor containing said resins and the aqueous solution purified from the fluorinated anionic surfactant, optionally concentrated and optionally added with the nonionic surfactant to have the concentrations indicated in step a1), is used in step a1).

11. A process according to claim 1 carried out in semibatch, wherein, in step a1) to a fluoropolymer dispersion obtainable with an emulsion or microemulsion polymerization process, fed into a reactor, the nonionic surfactant indicated in step a1) is added and then the other steps from a2) to a5) follow.

12. A process in semi-batch according to claim 11, wherein step a5) is carried out as follows: stopping both the washing solution feeding in the lower part of the reactor and the output of the aqueous phase from the upper part of the reactor, when from the upper part of the reactor an amount of washing solution equal to that introduced in step a3) has flown out; sedimentation of the dispersion until the desired value of fluoropolymer concentration, substantially PFOA free, is obtained; discharge of the concentrated fluoropolymer dispersion; input into the reactor of an additional aliquot of polymerization dispersion to be treated and repetition of steps of the process.

13. A process according to claim 1 carried out in a continuous way, wherein, under steady conditions: steps a1) and a2) are carried out in a pre-reactor or in line by feeding the obtained dispersion into the reactor approximately in the separation zone between the upper surnatant aqueous phase and the lower aqueous phase containing the fluoropolymer; step a2") being continuously carried out in the reactor; in step a5) the discharge being carried out in a continuous way.

14. A continuous process according to claim 13, wherein the dispersion feeding is carried out at a height H, measured starting from the reactor top, between 1/10 and 1 time the reactor diameter.

15. A process according to claim 13, wherein the washing water solution is fed at a height H2, measured from the reactor bottom, equal to from about 1/10 to 1 time the reactor diameter.

16. A process according to claim 13, wherein the process start step is carried out by using a semi-batch process.

17. A process according to claim 1, wherein the washing solution flow is variable.

18. A process according to claim 1, wherein mixtures of nonionic surfactants are used, having a CP value in the range indicated in step a1), or one or more surfactants with CP values in said range.

19. A process according to claim 1, wherein the used nonionic surfactants are polyethoxylated alcohols and polyethoxylated alkylphenols, optionally containing one or more units of propylene oxide.

20. A process according to claim 19, wherein the following nonionic surfactants are used:

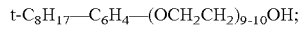

21. A process according to claim 1, wherein the fluoropolymers of the dispersions obtainable by emulsion or microemulsion polymerization are the TFE copolymers or the PTFE homopolymers.

* * * * *